June 13, 1972   A. F. SLECHTA ET AL   3,669,742
METHOD AND APPARATUS FOR CLEANING SETTLING TUBE MODULES
Filed July 30, 1970
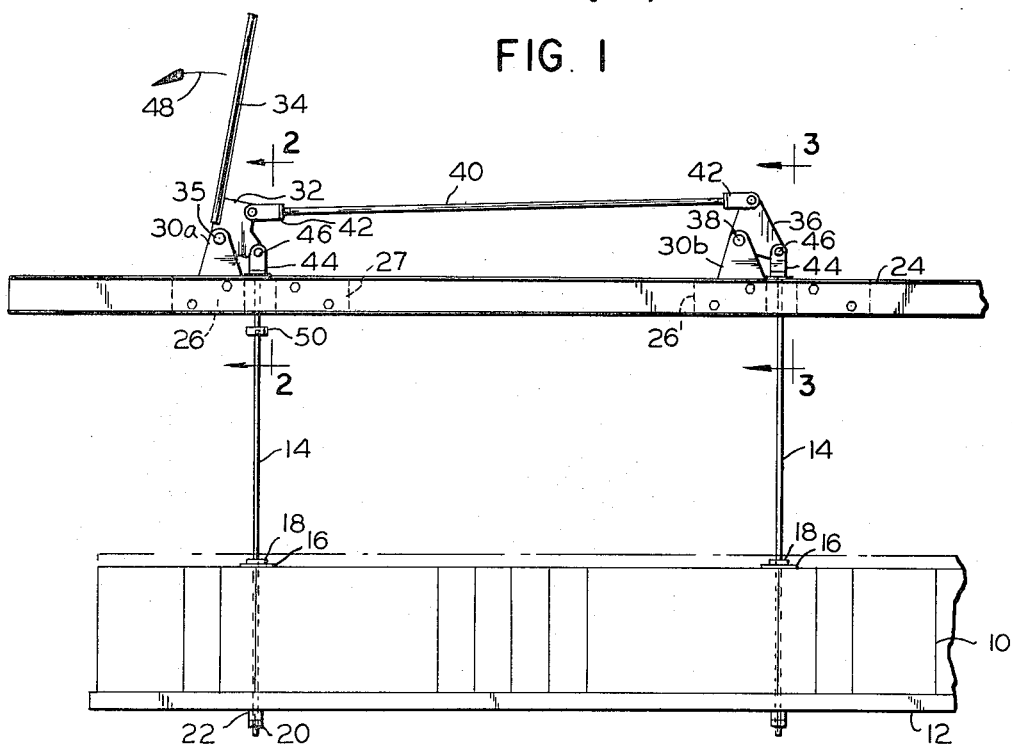
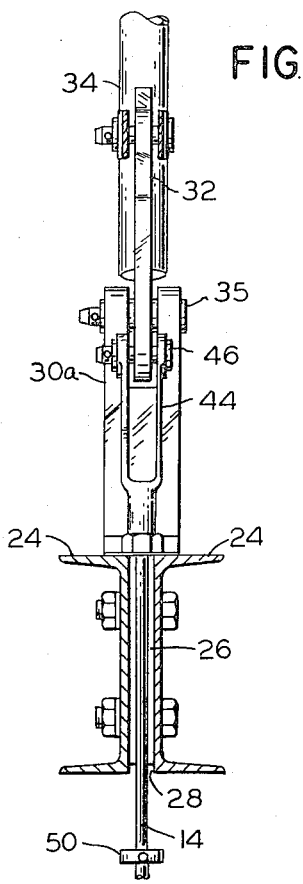
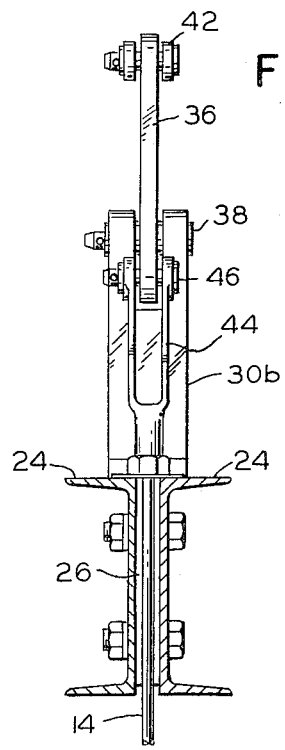
GORDON L. CULP
RICHARD G. DUNNAHOE
ALFRED F. SLECHTA
*INVENTORS.*
BY
BUCKHORN, BLORE, KLARQUIST & SPARKMAN
*ATTORNEYS*

United States Patent Office 3,669,742
Patented June 13, 1972

3,669,742
METHOD AND APPARATUS FOR CLEANING SETTLING TUBE MODULES
Alfred F. Slechta, Corvallis, Oreg., Gordon L. Culp, Kennewick, Wash., and Richard G. Dunnahoe, Corvallis, Oreg., assignors to Neptune Microfloc, Incorporated, Corvallis, Oreg.
Filed July 30, 1970, Ser. No. 59,425
Int. Cl. B08b 9/00
U.S. Cl. 134—23          2 Claims

ABSTRACT OF THE DISCLOSURE

Settling tube modules are cleaned of deposited material by reciprocating the module while immersed in the liquid of the settling basin to cause relatively rapid motion of the liquid through the individual settling tubes thereof. Good cleaning is achieved when the edge of the module is reciprocated through an amplitude of about two inches and the velocity of the module in the liquid during the reciprocation attains a value of at least two inches per second.

BACKGROUND OF THE INVENTION

Settling tubes for use in water and waste treatment processes have been disclosed in U.S. Pat. No. 3,482,694. Such tubes are desirably arranged in modules which are suspended below the level of liquid in the settling basin. Water or other liquid carrying a settleable material is passed in a streamlined flow condition through the tubes to permit the settleable material to deposit therewith.

Tube settling installations as aforementioned, however, have at times manifested a bridging of settleable material across the tops of and sometimes within the tubes. Bridging of such material is aesthetically unpleasing and also prevents subsequently deposited material from continuously sliding on the bottoms of the tubes toward the lower ends thereof to maintain the continuous self-cleaning function for which the tubes are designed.

Accordingly, it is the primary object of the present invention to provide an efficient and practical method and apparatus for cleaning deposited material from settling tube modules of the class described.

It is a still further object of the present invention to provide such a method and apparatus which will permit the modules to be cleaned while maintaining substantially continuous operation of the settling basins in which they are installed.

SUMMARY OF THE INVENTION

In accordance with the invention, settling tube modules are cleaned of deposited material while suspended in a settling basin by a method which comprises reciprocating the module in the liquid of the basin to cause relatively rapid motion of the tube surfaces through the liquid. The amplitude of reciprocation at the edge of the module is about two inches, while the velocity of the module in the liquid during the reciprocation preferably should attain a value of at least two inches per second.

The apparatus for cleaning the modules comprises a generally horizontal supporting member and means to suspend the modules beneath such member and below the level of liquid in the basin, such suspending means passing vertically through the supporting member. Means mounted on the supporting member and to which said suspended means are attached are adapted vertically to reciprocate such suspending means to cause relatively rapid vertical motion of the module in the liquid. Operation of such reciprocating means rapidly during a plurality of cycles has been found to effect efficient cleaning of the tubes.

BRIEF DESCRIPTION OF THE DRAWINGS

FIG. 1 is a side elevational view of apparatus in accordance with the present invention.
FIG. 2 is a sectional view to an enlarged scale taken on line 2—2 of FIG. 1.
FIG. 3 is a sectional view to the same scale as FIG. 2 and taken on line 3—3 of FIG. 1.

DESCRIPTION OF THE PREFERRED EMODIMENT

Referring to the drawings, a layer of settling tube modules 10 is supported on hanger channels 12 which are suspended by hanger rods 14 adjacent the ends of the modules. Hold-down plates 16 and lock collars 18 at the upper surface and nuts 20 and washers 22 positioned below retain the modules in snug engagement with the channels 12.

The modules are suspended in the basin from a pair of support channels 24 spaced apart by spacer plates 26, 27 to create an opening 28 therebetween through which the hanger rods 14 pass. The channels 24 are supported at the sidewalls of the settling basin (not shown) to provide structural support for the entire assembly.

A pair of plates welded to each of the spacer plates 26 defines clevises 30a, 30b. A crank plate 32 to which a pipe arm 34 is welded is rotatably mounted in the left-hand clevis 30a (as viewed in FIG. 1) to pivot about a pin 35. If desired, a pedal attached to the plate 32 may be substituted for the rod 34. A similar crank plate 36 is rotatably mounted in the right-hand clevis 30b to pivot about a pin 38. A tie rod 40 having a clevis 42 threadably received on each end is pivotally attached at one end to crank plate 32 and at the other end to the crank plate 36 for effecting simultaneous rotation of such plates about the pins 35 and 38, respectively.

A clevis 44 is threadedly received on the upper end of each of the hanger rods 14 and is pivotally attached to the respective crank plates 32, 36 by a clevis pin 46. Rotation of the pipe arm 34 in the direction of the arrow 48 causes the crank plates 32 and 36 to pivot about the pins 35, 38, respectively, thereby to reciprocate the hanger rods 14 in a vertical direction.

A lock collar 50 positioned approximately two inches below the supporting channels 24 limits the amplitude of the reciprocation, or stroke, to about two inches at the edge of the modules 10. A stroke of less than two inches has been found to result in a structural deflection at the center of the module causing a dampening effect, thereby not to clean the center portion of the tubes therein.

It has also been found necessary to have a sufficiently high velocity in the vertical direction to achieve adequate cleaning. We have found that the velocity of the module during the period of its reciprocation should attain a value of at least two inches per second. It has also been found that better cleaning is effected if five or six cycles are repeated very rapidly in succession.

Immediately after the modules are reciprocated in the vertical direction, a large amount of material washed from the tubes is visible in the area directly thereabove. To prevent carryover of this material, a quiescent period for the basin may be desirable to let it settle back through the tubes. The length of such a period will depend upon the material being handled. The apparatus is effective in removing the material which accumulates at the top and on the interior surface of the settling tubes.

Other means vertically to reciprocate the hanger rods 14 may desirably be used. Such means include a pneumatic piston and cylinder; inflatable members positioned beneath the settling tube modules which members are adapted to elevate such modules when inflated and to be compressed flat by the weight of the modules when in the deflated condition; and a spring support for the hanger rods, vertical motion of which causes sufficient oscillation effectively to clean the tubes.

Having illustrated and described certain preferred embodiments of the invention, it should be apparent that the invention permits of modification in arrangement and detail.

1. The method of cleaning deposited material from a settling tube module comprising a plurality of elongated tubes of relatively small diameter inclined upwardly from the horizontal and suspended below the surface in a settling basin, comprising:

vertically reciprocating said module while said basin is in substantially continuous operation such that said tubes in said module are filled with the liquid in said settling basin, cause relatively rapid motion of such liquid through said tubes.

2. The method of claim 1 wherein
the amplitude of said reciprocation at the edge of said module is about two inches, and
the velocity of said module in said liquid during said reciprocation attains a value of at least two inches per second.

References Cited
UNITED STATES PATENTS

| | | | |
|---|---|---|---|
| 586,858 | 7/1897 | Mesta | 134—25 A UX |
| 3,047,436 | 7/1962 | Zinty | 134—23 |
| 3,449,163 | 6/1969 | Mobius et al. | 134—3 X R |
| 3,399,135 | 8/1968 | Conley et al. | 210—42 |
| 3,482,694 | 12/1969 | Rice et al. | 210—73 |

MORRIS O. WOLK, Primary Examiner

J. T. ZATARGA, Assistant Examiner

U.S. Cl. X.R.

134—32

UNITED STATES PATENT OFFICE
CERTIFICATE OF CORRECTION

Patent No. 3,669,742        Dated July 19, 1972

Inventor(s) Gordon L. Culp, Richard G. Dunnahoe, Alfred F. Sleckta

It is certified that error appears in the above-identified patent and that said Letters Patent are hereby corrected as shown below:

Column 3, line 19, insert --to-- before the word "cause".

Signed and sealed this 24th day of October 1972.

(SEAL)
Attest:

EDWARD M. FLETCHER, JR.         ROBERT GOTTSCHALK
Attesting Officer        Commissioner of Patents